(12) United States Patent
Giberson

(10) Patent No.: US 7,171,870 B1
(45) Date of Patent: Feb. 6, 2007

(54) GEARED FLUID DRIVE WITH PARALLEL START-UP CAPABILITY

(76) Inventor: Melbourne F. Giberson, 30 Ludwig's Crossing La., Glenmoore, PA (US) 19343-2667

( * ) Notice: Subject to any disclaimer, the term of this patent is extended or adjusted under 35 U.S.C. 154(b) by 245 days.

(21) Appl. No.: 10/963,360

(22) Filed: Oct. 12, 2004

Related U.S. Application Data

(60) Provisional application No. 60/588,683, filed on Jul. 16, 2004.

(51) Int. Cl.
*F16H 37/06* (2006.01)
*F16H 3/34* (2006.01)
*F16H 47/00* (2006.01)
*F02C 7/27* (2006.01)

(52) U.S. Cl. .................. 74/661; 74/352; 74/732.1; 60/788

(58) Field of Classification Search .......... 74/661, 74/665 A, 665 B, 352, 329, 364, 732.1, 733.1; 180/65.2–64.4; 60/788
See application file for complete search history.

(56) References Cited

U.S. PATENT DOCUMENTS

| | | | | |
|---|---|---|---|---|
| 2,878,691 A | * | 3/1959 | Schjolin | 477/6 |
| 3,497,738 A | * | 2/1970 | Mariani | 310/78 |
| 3,683,719 A | * | 8/1972 | Gros | 74/661 |
| 3,793,905 A | * | 2/1974 | Black et al. | 74/661 |
| 4,410,071 A | * | 10/1983 | Osterman | 477/4 |
| 5,505,662 A | * | 4/1996 | Giberson | 464/156 |
| 6,640,917 B2 | * | 11/2003 | Maruyama | 180/65.6 |
| 6,848,329 B2 | * | 2/2005 | Okada et al. | 74/339 |

* cited by examiner

*Primary Examiner*—Roger Pang
(74) *Attorney, Agent, or Firm*—Polster, Lieder, Woodruff & Lucchesi, L.C.

(57) ABSTRACT

In a system in which a large motor, to be energized from a power grid, is connected to drive a main fluid drive through a main impeller shaft that has a main impeller shaft gear mounted on it, a relatively small start-up motor is provided, driving a start-up fluid drive. A start-up gear is connected to be driven by the start-up fluid drive and selectively to drive the main impeller shaft gear, and to be disengaged from the main impeller shaft gear. In operation, the small motor is first started, with the start-up gear engaging the main impeller shaft gear, and brought up to a speed at which the large motor begins to rotate at close to synchronous speed with the electrical frequency of the grid, at which point the large motor is connected to the grid.

12 Claims, 1 Drawing Sheet

GEARED FLUID DRIVE WITH PARALLEL START-UP CAPABILITY

CROSS REFERENCE TO RELATED APPLICATIONS

PRIORITY IS CLAIMED BASED ON PROVISIONAL APPLICATION Ser. No. 60/588,683 FILED JUL. 16, 2004, WHICH IS INCORPORATED HEREIN BY REFERENCE.

STATEMENT REGARDING FEDERALLY SPONSORED RESEARCH OR DEVELOPMENT

Not Applicable

BACKGROUND OF THE INVENTION

When a large (e.g. 10,000 horsepower or larger) synchronous or induction motor is started "across the line", the resultant inrush current taxes the associated switchgear, and, if the motor is brought up to speed directly, the electrical frequency of the motor is out of phase with the electrical frequency of the grid to which it is connected until such time as the motor reaches the appropriate speed. It is desirable to bring the motor up to speed slowly, then to synchronize it with the grid and then to close the breaker with no significant current inrush.

BRIEF SUMMARY OF THE INVENTION

In accordance with this invention, generally stated, in a geared fluid drive in which a large motor is connected to drive a variable speed load such as a compressor, pump, or fan by way of a main fluid drive or coupling, a start-up power path uses a smaller fluid drive that transfers power from a relatively smaller motor to a set of gears with an intermediate idler, arranged so as to drive the input side of the main fluid drive. In the preferred embodiment, the intermediate idler is hydraulically actuated to disengage it while the train is rotating, although some other means for moving the idler shaft, such as a solenoid or mechanical mechanism, could be used. In the described embodiment, the rotation of the train must be stopped for the idler to be engaged. In the illustrative embodiment shown and described, the main power train utilizes a set of gears, which could be speed increasing or decreasing, but a direct drive arrangement with the runner shaft of the main fluid drive coupled directly to the load can be used.

DETAILED DESCRIPTION OF INVENTION

Figure 1:
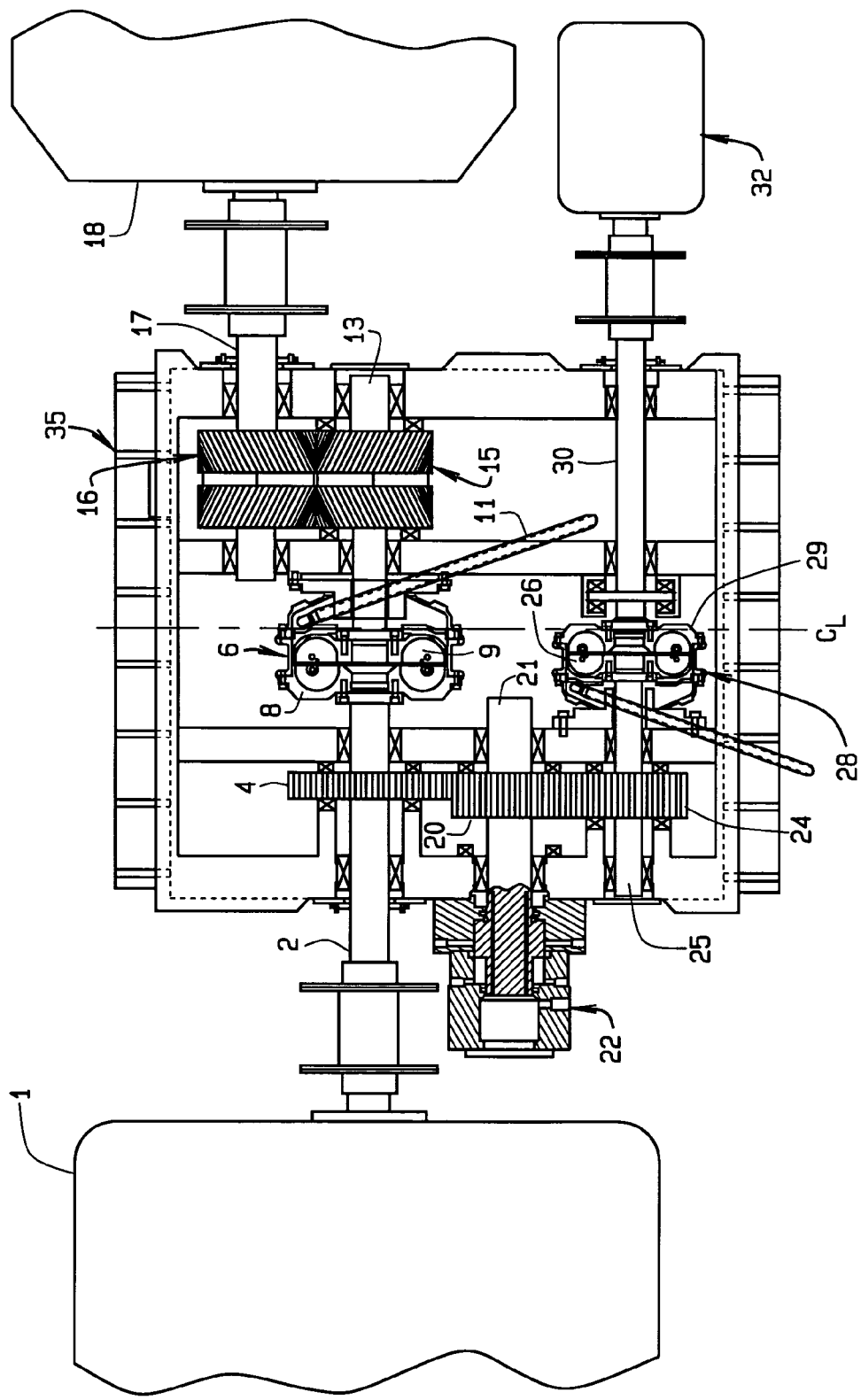
FIG. 1 is a longitudinal cross-sectional view of one illustrative embodiment of this invention.

Reference numeral 1 indicates a large motor, which may be a synchronous motor or an induction motor, on the order of 10,000 hp, or larger. The importance of size is related to the ability of the grid, switchgear and motor to handle the electrical conditions if this motor is started with an "across the line" start. In almost all cases, it is better for the motor, the switchgear, and the grid if any relatively large motor is brought up to speed slowly and then synchronized to the grid and the breaker closed with no significant current inrush. In the embodiment shown, the large motor 1 is connected to an input drive shaft of an impeller 8 of a main fluid drive 6. A gear 4 is mounted on the input shaft 2 between the motor 1 and the impeller 8. A runner 9 is connected to an output shaft 13. A scoop tube 11 performs the usual function of a scoop tube in a fluid drive. In this embodiment, a gear 15, mounted on the output shaft 13, meshes with a gear 16 on a shaft 17 connected to drive a compressor 18.

An idler gear 20 meshes with the input shaft gear 4, and with a start-up drive gear 24. The idler gear 20 is mounted on a shaft 21 which is moved axially by hydraulic idler gear shaft shifter 22 from a position at which the gear 20 meshes with the gear 4 and gear 24, to a position which it is disengaged from at least the gear 4. The start-up shaft 25 is connected to a runner 26 in a start-up fluid drive 28. The start-up fluid drive 28 has an impeller 29 connected to a shaft 30 driven by a start-up motor 32. As will be observed, the entire assembly, between the large motor and driven equipment and between the start-up motor and the internal gearing is housed in a single housing 35.

In this arrangement, the "start-up motor" 32 is a relatively small induction motor, on the order of 500 to 5000 hp. The switchgear for the start-up motor is sized to handle the inrush current for a motor of this size.

To start the system, the oil system is started, the idler gear is engaged, and the scoop tubes for both fluid drives are moved to the minimum power positions. The start-up motor is started. The scoop tube of the small start-up fluid drive is moved slowly toward the higher power position, and the large (main) motor begins to rotate and to increase speed. The scoop tube of the smaller fluid drive is gradually moved to higher speed positions, and at some position, the electrical frequency of the large (main) motor is close to the electrical frequency of the grid. A synchronizing apparatus, or a synchroscope and manual breaker closing procedure, is/are used to operate the scoop tube so that the large (main) motor and grid are electrically in phase, and then the breaker is closed (automatically or manually) so that the large (main) motor is now connected to and powered by the grid. Because there is no significant inrush current condition for the large motor, the switchgear needs to be sized only for full load amperage at the rated power factor condition with a small service factor, in contrast to the normal inrush current that would occur if the motor were "dropped across the line" to start it, in which case the inrush current would be on the order of nine times rated current.

During this start-up process and as the large (main) motor is approaching full speed, the impeller of the main fluid drive, rotating at the same speed as the large (main) motor, will transmit torque to the runner and then through the main gear, if used, to the compressor train. Depending upon the flow of circuit oil and the position of the scoop tube for the main fluid drive, the compressor may begin to rotate. It may be beneficial to use the start-up motor to drive the compressor train part-way up in speed, and the desire or requirements to do so will determine any increase in the size of the start-up motor above the minimum required to bring the large (main) motor to operating speed and to connect it to the grid.

After the large (main) motor has started, and is taking power from the grid, the scoop tube of the start-up fluid drive is moved to the minimum power position, the idler gear is disengaged and locked out, and the start-up motor and start-up fluid drive are shut down.

Then the large (main) fluid drive operates as if the start-up fluid drive does not exist.

Alternately, if the start-up gear train remains engaged, in the embodiment shown, the power available to drive the load is the sum of the main motor power plus the power available from the start-up motor through the start-up fluid drive and the start-up gear.

As has been observed, all of the fluid drive and gear hardware is in one housing. The space required for all of the main fluid drive, gear, and start-up fluid drive functions is minimized, and the capital cost of the drive train hardware and motors, as well as for the electrical switchgear is minimized.

Numerous variations in the construction and operation of the device of this invention, within the scope of the appended claims, will occur to those skilled in the art in the light of the foregoing disclosure. Merely by way of example, if a clutch is interposed between the start-up fluid drive and the idler gear, it can be disengaged when the large (main) motor drive is up to speed, so that the idler gear need not be disengaged physically, but can continue to be meshed with the main gear. If the clutch, such as a disconnect coupling similar to the one disclosed in U.S. Pat. No. 5,505,662, is interposed between the start-up fluid drive and the start-up drive gear, it is possible to omit the disengaging function of the idler gear. Depending upon the type of clutch, the main gear does not have to be stopped to permit the idler gear or the start-up gear, as the case may be, to mesh with the main gear. The mechanism by which the idler gear of the embodiment shown and described is shifted or, if a clutch is employed, by which the clutch is engaged and disengaged, can also be varied, operating electrically, as by a large solenoid, electro-mechanically, or even manually, although the hydraulic system shown is simple and effective. These variations are merely illustrative.

Having thus described the invention, what is claimed and desired to be secured by Letters Patent is:

1. A fluid drive with parallel start-up capability, comprising a large motor connected to drive a main fluid drive through a main impeller shaft, a main impeller shaft gear mounted on said main impeller shaft, a relatively small start-up motor, a start-up fluid drive connected to be driven by said start-up motor, a start-up gear connected to be driven by said start-up fluid drive and selectively to drive said main impeller shaft gear, and means for operatively connecting said start-up fluid drive to said main impeller shaft gear and for disconnecting said start-up fluid drive from said main impeller shaft gear.

2. The fluid drive of claim 1 including an idler gear mounted on an idler gear shaft parallel with said main impeller shaft and meshing with said main impeller shaft gear, a mechanism for shifting said idler gear shaft axially to move said idler gear out of engagement with said main impeller shaft gear, a start-up drive gear meshing with said idler gear, said start-up drive gear being mounted on a start-up drive shaft connected to a runner of a start-up fluid drive, an impeller of which is connected to be driven by said start-up motor.

3. The drive of claim 1 wherein the main fluid drive, main impeller shaft gear, start-up drive gear, and start-up fluid drive are all mounted in a single housing.

4. The drive of claim 2 wherein the main fluid drive, main impeller shaft gear, idler gear, start-up drive gear, and start-up fluid drive are all mounted in a single housing.

5. The drive of claim 1 wherein a main runner shaft gear is mounted on a main runner shaft, a main output shaft is connected to a driven load, and a main output shaft gear is mounted on said main output shaft and engaged with said main runner shaft gear mounted on said main runner shaft.

6. The drive of claim 5 wherein said main fluid drive, main impeller shaft gear, start-up drive gear, start-up fluid drive, main runner shaft, main runner shaft gear, main output shaft, and main output shaft gear are all mounted in a single housing.

7. The fluid drive of claim 2, wherein a main runner shaft gear is mounted on a main runner shaft, a main output shaft is parallel to said main runner shaft and connected to a driven load, and a main output shaft gear is mounted on said main output shaft and engaged with said main runner shaft gear mounted on said main runner shaft.

8. The drive of claim 7 wherein said main fluid drive, main impeller shaft gear, start-up drive gear, start-up fluid drive, main runner shaft gear, main output shaft, and main output shaft gear are all mounted in a single housing.

9. A geared fluid drive with parallel start-up capability, comprising a large motor connected to drive a main fluid drive through a main input shaft, a main input shaft gear mounted on said main input shaft, a main impeller shaft parallel to said main input shaft, a main impeller shaft gear mounted on said main impeller shaft and engaged with said main input shaft gear, a main fluid drive driven by the main impeller shaft, a main fluid drive runner shaft connected to a driven load, a relatively small start-up motor, a start-up fluid drive connected to be driven by said start-up motor, a start-up gear connected to be driven by said start-up fluid drive and selectively to drive said main input shaft gear, and means for operatively connecting said start-up fluid drive to said main input shaft gear and for disconnecting said start-up fluid drive from said main input shaft gear.

10. The fluid drive of claim 9 including an idler gear mounted on an idler gear shaft parallel with said main input shaft gear, a mechanism for shifting said idler gear shaft axially to move said idler gear out of engagement with said main input shaft gear, a start-up drive gear meshing with said idler gear, said start-up drive gear being mounted on a start-up drive shaft connected to a runner of a start-up fluid drive, an impeller of which is connected to be driven by said start-up motor.

11. The drive of claim 9 wherein the main input shaft, main input shaft gear, main impeller shaft, main impeller shaft gear, main fluid drive, start-up drive gear, and start-up fluid drive are all mounted in a single housing.

12. The drive of claim 10 wherein the main input shaft, main input shaft gear, main impeller shaft, main impeller shaft gear, main fluid drive, idler gear, start-up drive gear, and startup fluid drive are all mounted in a single housing.

* * * * *